US012100904B2

(12) United States Patent
Kong et al.

(10) Patent No.: US 12,100,904 B2
(45) Date of Patent: Sep. 24, 2024

(54) GLASS ANTENNA STRUCTURE

(71) Applicants: HYUNDAI MOTOR COMPANY, Seoul (KR); KIA CORPORATION, Seoul (KR); HONGIK UNIVERSITY INDUSTRY-ACADEMIA COOPERATION FOUNDATION, Seoul (KR)

(72) Inventors: Nak Kyoung Kong, Seongnam-si (KR); Jong Min Park, Seoul (KR); Young Joon Shin, Seongnam-si (KR); Ki Hong Lee, Seoul (KR); Dae Hee Lee, Incheon (KR); Do Young Jang, Seoul (KR); Sang Woon Youn, Anyang-si (KR); Ho Sung Choo, Seoul (KR)

(73) Assignees: HYUNDAI MOTOR COMPANY, Seoul (KR); KIA CORPORATION, Seoul (KR); HONGIK UNIVERSITY INDUSTRY-ACADEMIA COOPERATION FOUNDATION, Seoul (KR)

( * ) Notice: Subject to any disclaimer, the term of this patent is extended or adjusted under 35 U.S.C. 154(b) by 115 days.

(21) Appl. No.: 18/084,343

(22) Filed: Dec. 19, 2022

(65) Prior Publication Data

US 2024/0047887 A1 Feb. 8, 2024

(30) Foreign Application Priority Data

Aug. 8, 2022 (KR) ........................ 10-2022-0098291

(51) Int. Cl.

| | |
|---|---|
| ***H01Q 9/30*** | (2006.01) |
| ***H01Q 1/32*** | (2006.01) |
| ***H01Q 5/378*** | (2015.01) |

(52) U.S. Cl.

CPC ................. *H01Q 9/30* (2013.01); *H01Q 1/32* (2013.01); *H01Q 5/378* (2015.01)

(58) Field of Classification Search

CPC .. H01Q 1/32; H01Q 343/711; H01Q 343/712; H01Q 343/713; H01Q 9/30; H01Q 5/378

See application file for complete search history.

(56) References Cited

U.S. PATENT DOCUMENTS 6,008,767 A 12/1999 Taniguchi et al.
9,337,525 B2 5/2016 Dai (Continued)

FOREIGN PATENT DOCUMENTS

CN 212085212 U 12/2020
JP 2018074263 A 5/2018

(Continued)

OTHER PUBLICATIONS

Juhyung Lee et al., Transparent Monopole Antenna on the Front Glass of an Automobile for FM Band, The Journal of Korean Institute of Electromagnetic Engineering and Science; vol. 29, 2018, pp. 477-483.

(Continued)

*Primary Examiner* — Henry Luong

(74) *Attorney, Agent, or Firm* — Lempia Summerfield Katz LLC

(57) ABSTRACT

The present disclosure provides a glass antenna structure including: a glass sheet provided in a vehicle; a monopole antenna unit located on one surface of the glass sheet; a plurality of rectangular patch planes located on another surface of the glass sheet at a position corresponding to the monopole antenna unit; and a co-planar waveguide (CPW) feeding line in contact with one end of the monopole antenna unit.

10 Claims, 11 Drawing Sheets

(56) References Cited

U.S. PATENT DOCUMENTS

| | | | | |
|---|---|---|---|---|
| 10,673,122 | B2 | 6/2020 | Appold et al. | |
| 10,734,701 | B2 * | 8/2020 | Morris | H01Q 1/1271 |
| 10,737,469 | B2 | 8/2020 | Droste et al. | |
| 11,108,141 | B2 | 8/2021 | Furlan | |
| 2018/0037006 | A1 | 2/2018 | Droste et al. | |
| 2018/0115048 | A1 | 4/2018 | Kagaya | |

FOREIGN PATENT DOCUMENTS

| | | | |
|---|---|---|---|
| KR | 20010054022 | A | 7/2001 |
| KR | 100750660 | B1 | 8/2007 |
| KR | 20170121274 | A | 11/2017 |
| KR | 102065722 | B1 | 1/2020 |

OTHER PUBLICATIONS

Yonghyun Yoon, Dual-band Planar Monopole Antenna for Autonomous Vehicle, The Journal of Korea Institute of Information, Electronics, and Communication Technology; vol. 12; Issue 4; pp. 343-348; 2019.

* cited by examiner

GLASS ANTENNA STRUCTURE

CROSS-REFERENCE TO RELATED APPLICATION

This application claims, under 35 U.S.C. § 119(a), the benefit of and priority to Korean Patent Application No. 10-2022-0098291, filed on Aug. 8, 2022, the entire contents of which are incorporated herein by reference.

BACKGROUND

(a) Technical Field

The present disclosure relates to a glass antenna structure. More particularly, it relates to a single glass sheet including a printed antenna in consideration of reflection coefficient, efficiency, and gain while maintaining aesthetics in a vehicle.

(b) Background Art

Recently, the demand for automobiles has been explosively increasing, as Korea is in the era of "one car for every two people." As the demand for automobiles increases and the number of actual automobiles increases, the number of traffic accidents also increases proportionally.

However, driver carelessness is a major cause of such traffic accidents, and wireless access in vehicular environments (WAVE) communication is emerging as a way to reduce traffic accidents caused by driver carelessness. WAVE is a next-generation vehicle communication environment and is a very important element in high-speed vehicle-to-vehicle (V2V) communication and vehicle-to-infrastructure (V2I) communication.

Furthermore, fifth-generation (5G) communication technology has recently been spotlighted for the purpose of improving travel environment by collecting a large amount of data such as travel information on other vehicles, surrounding traffic information, and pedestrian information. When an antenna for communication is mounted on a vehicle, glass antenna technology of printing an antenna pattern on a windshield glass is used in order to minimize the additional space for mounting the antenna and maintain aesthetics of the vehicle. However, because a current glass antenna is designed for amplitude modulation (AM) and frequency modulation (FM) reception, a new antenna design technology for 5G bands is needed.

Experiments to apply such WAVE communication technology to a vehicle and experiments to implement the same in a large vehicle such as a bus on a highway are actively being conducted. Such WAVE communication may be implemented using a shark antenna installed in a general passenger car, but because such an antenna is installed outside the vehicle, installation is difficult, and the installation structure is complicated.

The above information disclosed in this Background section is only for enhancement of understanding of the background of the disclosure. Therefore, this Background section may contain information that does not form the prior art that is already known to a person of ordinary skill in the art.

SUMMARY OF THE DISCLOSURE

The present disclosure has been made in an effort to solve the above-described problems associated with the prior art.

It is an object of the present disclosure to provide a glass antenna structure providing a monopole antenna unit located on one surface of a glass sheet.

Another object of the present disclosure is to provide a single glass sheet antenna structure including a monopole antenna unit having an optimized size.

Another object of the present disclosure is to provide a glass antenna structure including a rectangular patch plane used as a sheet-like waveguide or a reflective surface so as to improve frontal gain characteristics.

The objects of the present disclosure are not limited to the above-mentioned objects. Other objects of the present disclosure not mentioned herein may be understood based on the following description, and may be understood more clearly through embodiments of the present disclosure. The objects of the present disclosure may be realized by means and combinations thereof indicated in the claims.

In one aspect, the present disclosure provides a glass antenna structure including: a glass sheet provided in a vehicle; a monopole antenna unit located on one surface of the glass sheet; a plurality of rectangular patch planes located on another surface of the glass sheet at a position corresponding to the monopole antenna unit; and a co-planar waveguide (CPW) feeding line in contact with one end of the monopole antenna unit.

In an embodiment, the glass antenna structure may further include a disk element located at an end of the monopole antenna unit.

In another embodiment, the disk element may have one side having a length of ⅕ wavelength of a corresponding frequency.

In another embodiment, the glass antenna structure may further include at least one parasitic element located on the one surface of the glass sheet on which the monopole antenna unit is located, and located adjacent to a side surface of the monopole antenna unit.

In another embodiment, the parasitic element may be divided into two groups, each group having two longitudinally separated parasitic elements located at each side in the widthwise direction of the monopole antenna unit. One parasitic element may be spaced apart in the longitudinal direction from another parasitic element adjacent thereto or from the CPW feeding line by 0.15±0.05 millimeters (mm), and may be spaced apart from the monopole antenna unit by 0.15±0.05 mm in the widthwise direction.

In another embodiment, the rectangular patch planes may be spaced apart from one another to have identical spacings in the longitudinal direction of the glass sheet.

In another embodiment, the rectangular patch planes may be spaced apart from one another to have identical spacings in the widthwise direction of the glass sheet.

In another embodiment, the CPW feeding line may have a width of 0.5±0.1 mm.

In another embodiment, the monopole antenna unit may have a longitudinal length of 1.23±0.1 mm from the CPW feeding line.

In another embodiment, the glass sheet may have a thickness of ⅓ wavelength to ½ wavelength of a corresponding frequency.

Other aspects and embodiments of the disclosure are discussed below.

It is to be understood that the terms "vehicle" or "vehicular" or the like, as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

The above and other features of the disclosure are discussed below.

BRIEF DESCRIPTION OF THE DRAWINGS

The above and other features of the present disclosure are now described in detail with reference to certain embodiments thereof illustrated in the accompanying drawings which are given hereinbelow by way of illustration only, and thus are not limitative of the present disclosure, and wherein.

Figure 1:
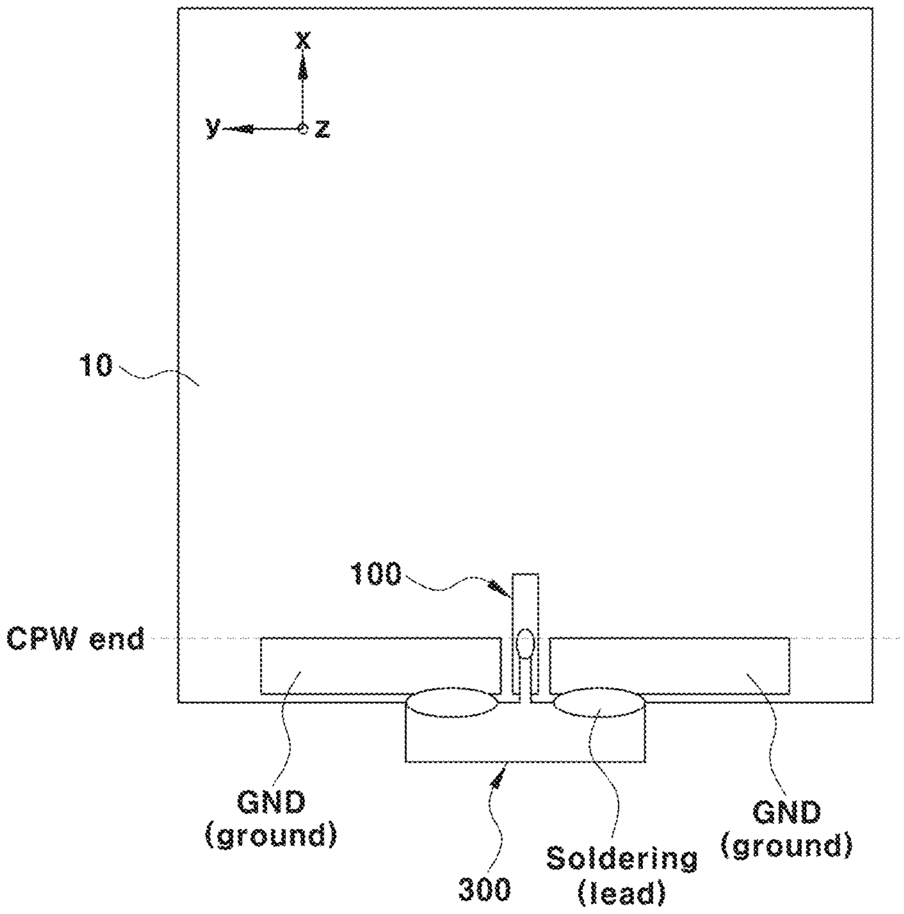
FIG. 1 illustrates one surface of a glass sheet including a monopole antenna unit, as an embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, may be determined in part by the particular intended application and usage environment.

In the figures, the reference numbers refer to the same or equivalent parts of the present disclosure throughout the several figures of the drawing.

DETAILED DESCRIPTION

Hereinafter, embodiments of the present disclosure are described in detail with reference to the accompanying drawings. Embodiments of the present disclosure may be modified into various forms. The scope of the present disclosure should not be construed as being limited to the following embodiments. Embodiments are provided to more completely explain the present disclosure to those having ordinary skill in the art.

Terms such as “ . . . element,” “ . . . patch,” “ . . . unit,” “ . . . glass,” and the like, used in this specification each refer to a unit that processes at least one function or operation, and may be implemented as hardware or software or a combination of hardware and software.

In this specification, the components are distinguished using “x-direction,” “y-direction,” and so on because the names of the components are the same. The x-direction and the y-direction are at 90 degrees to each other on a plane. As an embodiment of the present disclosure, it may be interpreted that the x-direction has the same meaning as a longitudinal direction as a vertical direction on a glass sheet plane. It may also be interpreted that the y-direction has the same meaning as a widthwise direction as a left-right direction on the glass sheet plane.

In this specification, the directions of components are distinguished as a first direction, a second direction, and the like. In this case, the first direction and the second direction are interpreted as opposite directions on the glass sheet plane.

Hereinafter, an embodiment is described in detail with reference to the accompanying drawings, and in the description given with reference to the accompanying drawings, the same or corresponding components are assigned the same reference numerals, and a description thereof is not repeated.

FIG. 1 illustrates a glass sheet 10 antenna structure including a monopole antenna unit 100, as an embodiment of the present disclosure.

As illustrated in the drawing, the structure includes the glass sheet 10 facing outside a vehicle and the monopole antenna unit 100 located on at least a portion of one surface of the glass sheet 10. In an embodiment of the present disclosure, the glass sheet 10 may be made of soda-lime glass, and the glass sheet may have one surface, which is a base of substrate, on which the monopole antenna unit 100 is printed. The glass sheet 10 may have a permittivity ratio of about 7.0. More particularly, the permittivity ratio of the glass sheet 10 of the present disclosure may have a range of 6.8 to 7.1.

In another embodiment, the monopole antenna unit 100 is located on one surface of the glass sheet 10. More specifically, in the other embodiment of the present disclosure, the monopole antenna unit 100 may be located on the upper side or lower side of the glass sheet 10. The monopole antenna unit 100 includes a connector to feed the vehicle. The connector is implemented as a co-planar waveguide (CPW) feeding line 300 and configured to feed the vehicle at one end of the glass sheet 10. The one end of the glass sheet 10 and the end of the monopole antenna unit 100 are in line with each other so as to transmit and receive an electrical signal to the vehicle.

In an embodiment of the present disclosure, the monopole antenna unit 100 includes a monopole antenna patch located on one surface of the glass sheet and extending in the x-direction. In the monopole antenna patch of the monopole antenna unit 100, the vertical (height or x-direction) length, the horizontal (width or y-direction) length, and the permittivity of the glass sheet 10 are used as design variables. In this example, the size of the monopole antenna patch of the corresponding antenna may have a maximum frontal gain while resonating at 28 gigahertz (GHz).

The monopole antenna unit 100 may have a length of 1.23±0.1 millimeters (mm) in the longitudinal direction from the end of a CPW feeding line 300 and have a width of 0.5±0.1 mm. The monopole antenna unit 100 may have the same width as that of a CPW feeding element.

The monopole antenna unit 100 may be printed on one surface of the glass sheet 10 by laser processing or silk screening. The monopole antenna unit 100 may be made of copper or silver having electrical conductivity, or a mixture of materials containing silver.

The glass sheet 10 has one surface on which the monopole antenna unit 100 is printed, and the one surface is coated by a coating layer. The coating layer may have properties to prevent physical damage to the monopole antenna unit 100 printed on the one surface of the glass sheet 10. More particularly, the coating layer may be formed of a fluorine-based coating agent, an epoxy-based coating agent, or a silicone coating agent, for example, OS-210HF (i.e., DRY-SURF™) or DS-530Z.

The monopole antenna unit 100 may be positioned to be partially open at one end of the glass sheet 10. The open one end of the monopole antenna unit 100 may include a connector connected to the vehicle body through a cable. In an embodiment of the present disclosure, the connector and the cable may include the CPW feeding line 300 so as to transmit an electrical signal. The CPW feeding line 300 is coupled to the monopole antenna unit 100 and to grounds positioned at opposite sides of the monopole antenna unit 100.

The monopole antenna unit 100 and the ground have a gap therebetween. In consideration of the size of the monopole antenna patch, the extension line has a smaller width than that of the monopole antenna patch. The grounds may be spaced apart to be positioned at left and right portions of the glass sheet 10 on which the monopole antenna patch is located.

In the present disclosure, the CPW feeding line 300 is configured to perform feeding at 5G frequency bands (28 mm Wave bands). The CPW feeding line 300 of the present disclosure is connected to a cable connected from a power supply source mounted on the vehicle. As a power cable, a general coaxial cable may be used, but the type of cable is not limited as long as the cable exhibits good performance and has a structure in which an inner core (+) and an outer shell (−) are clearly separated from each other. In the CPW feeding line 300, the line portion is connected to the inner core of the cable and the ground is connected to the outer shell of the cable. The connection may be made by soldering or using other similar electrical connection methods.

The glass sheet 10 may have another surface, which is opposite the one surface of the glass sheet 10 on which the monopole antenna unit 100 is positioned. On the other surface of the glass sheet 10, a plurality of rectangular patch planes 200 is positioned. Because the plurality of rectangular patch planes 200 determines the main radiation direction of the antenna, the same serves as a sheet-like waveguide or a reflective surface. The rectangular patch planes 200 may have various shapes. The rectangular patch planes 200 may be arranged in a plurality of columns and rows on the other surface of the glass sheet 10.

As an embodiment of the present disclosure, the rectangular patch plane 200 may perform radiation from the other surface of the glass sheet 10, and thus may serve as a reflective surface. For example, when a radio wave radiated from the monopole antenna unit 100 and the reflected wave from the rectangular patch plane 200 have a phase difference of 180°, the direct wave applied from the monopole antenna unit 100 is canceled by the reflected wave reflected from the rectangular patch plane 200, so that the intensity of the radio wave is reduced.

When the radio wave radiated from the monopole antenna unit 100 and the reflected wave from the rectangular patch plane 200 have a phase difference of 0° (or 360°), the direct wave applied from the monopole antenna unit 100 is reinforced by the reflected wave reflected from the rectangular patch plane 200 to thereby increase the intensity of the radio wave.

Depending on the distance between the rectangular patch plane 200 and the glass sheet 10 and the shape of the rectangular patch plane 200, the rectangular patch plane 200 may serve as a reflective surface that radiates radio waves to the one surface on which the monopole antenna unit 100 is located.

Conversely, when a radio wave is radiated to the other surface of the glass sheet 10 and the rectangular patch plane 200 serves as a sheet-like waveguide, the radio wave may be radiated on the other surface of the glass sheet 10 on which the rectangular patch planes 200 are located.

Figure 2A:
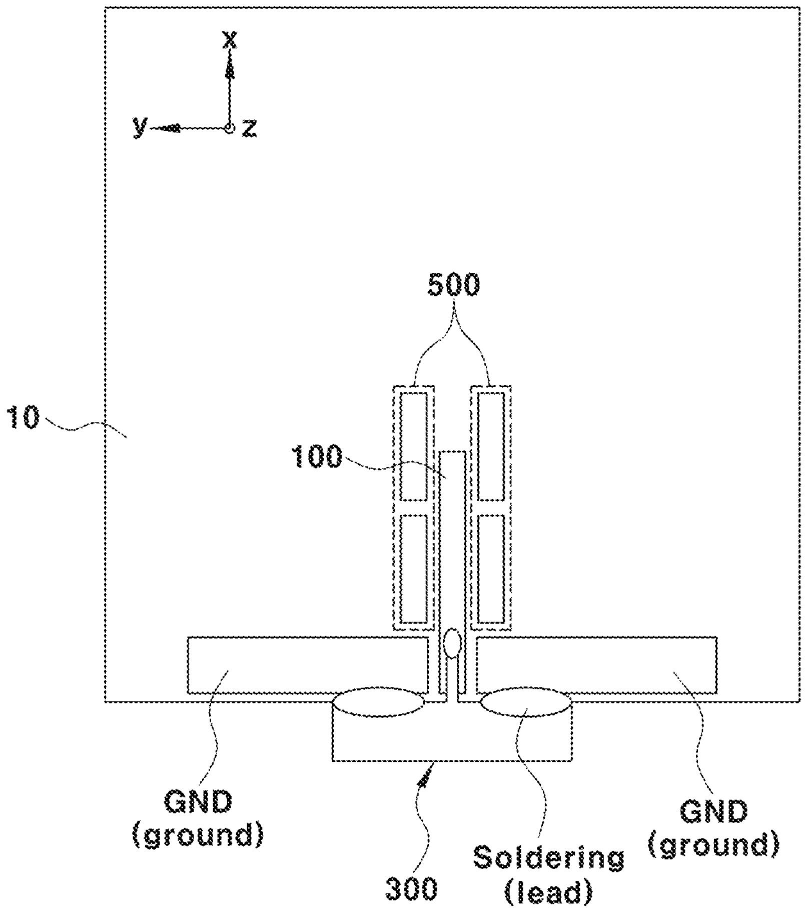
FIG. 2A illustrates one surface of a glass sheet including a monopole antenna unit to which a parasitic element is added, as another embodiment of the present disclosure.
Figure 2B:
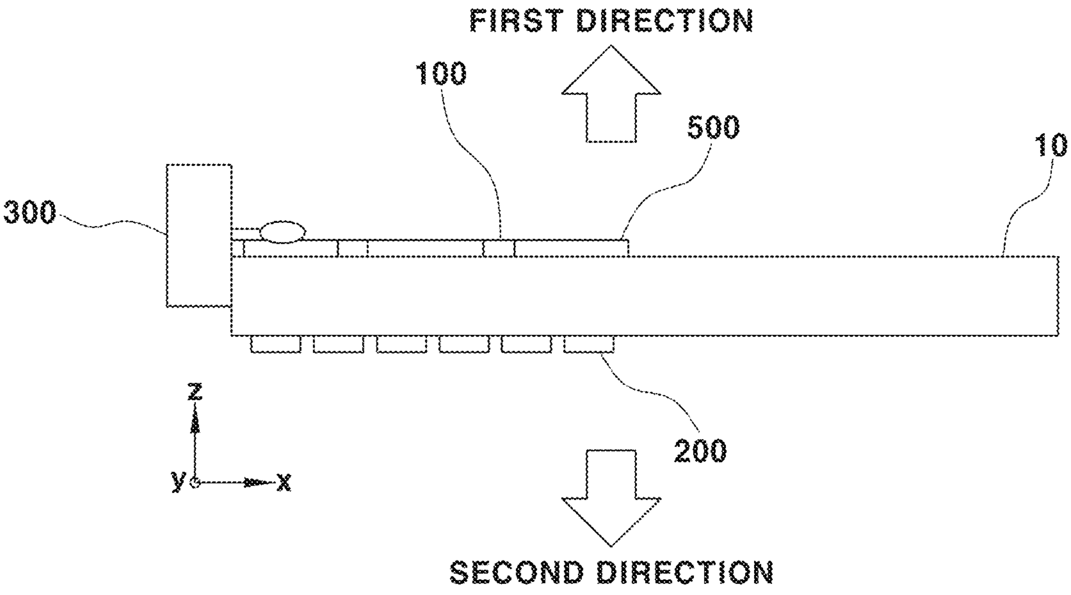
FIG. 2B illustrates a cross-sectional side view of the glass sheet including the parasitic element, as the other embodiment of the present disclosure.

FIGS. 2A and 2B illustrate parasitic elements 500 separated from each other in the widthwise direction with the monopole antenna unit 100 therebetween, as another embodiment of the present disclosure.

The parasitic elements 500 have substantially the same shape as the monopole antenna unit 100, which is a rectangular shape having a long side in the longitudinal direction. The parasitic elements 500 may be positioned side by side with the monopole antenna unit 100 interposed therebetween, and the parasitic elements 500, positioned at each of the opposite sides of the monopole antenna unit 100, may be divided in two in the longitudinal direction.

When a parasitic element 500 is added to the antenna structure, the maximum gain and the gain-bandwidth are increased compared to the existing antenna structure, which includes only the monopole antenna unit 100. In this example, the gain-bandwidth is the frequency having the maximum gain, which is the frequency band showing at least ½ of the maximum gain (at least-3 decibels (dB) of the maximum gain).

As an embodiment of the present disclosure, in the antenna structure including a parasitic element 500, the parasitic element 500 may have a length of about 1/7 wavelength (1.4±0.1 mm) of a corresponding frequency in the x-direction, and a width of about 1/9 wavelength (0.8±0.1 mm) of a corresponding frequency in the y-direction.

Because the two parasitic elements 500 at one side are separated from each other in the longitudinal direction, a first parasitic element 500 positioned adjacent to the CPW feeding element may have a gap of about 1/100 wavelength (0.15±0.05 mm) of a corresponding frequency in the longitudinal direction from the end of the CPW feeding element.

A parasitic element 500 positioned far from the CPW feeding element in the longitudinal direction may have a lower end spaced apart by about 1/100 wavelength (0.15±0.05 mm) of a corresponding frequency from the upper end of the first parasitic element 500 in the longitudinal direction.

The parasitic elements 500 each may have a gap of about 1/100 wavelength (0.15±0.05 mm) of a corresponding frequency from the monopole antenna unit 100 in the widthwise direction. The parasitic elements 500 are symmetrical left and right with respect to the monopole antenna unit 100 interposed therebetween.

Figure 3:
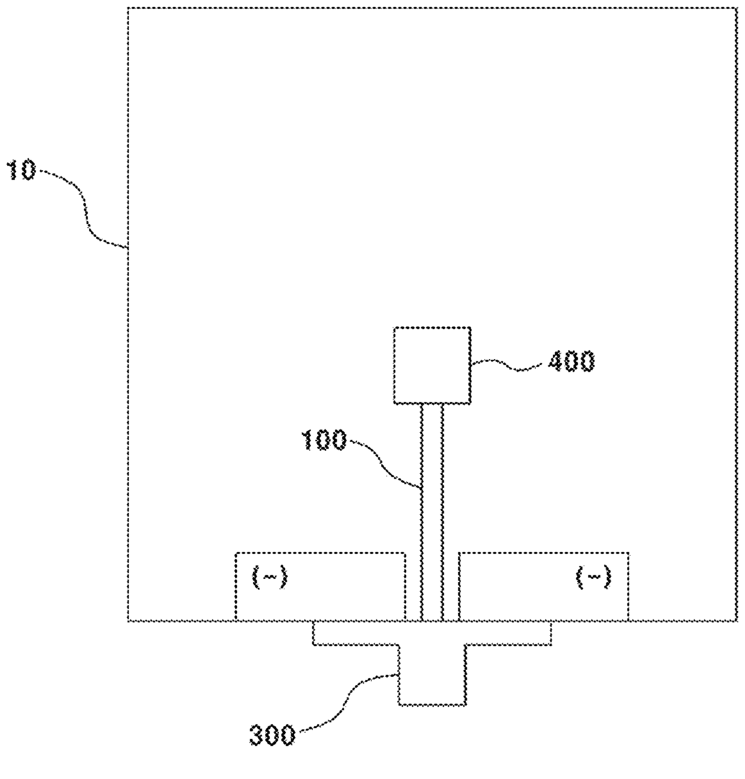
FIG. 3 illustrates one surface of a glass sheet including a monopole antenna unit to which a disk element is added, as a different embodiment of the present disclosure.

FIG. 3 illustrates a different embodiment in which a disk element 400 is positioned at an end of the monopole antenna unit 100, as an embodiment of the present disclosure.

As illustrated in the drawing, the monopole antenna unit 100 is coupled to the CPW feeding element positioned close to one end of the glass sheet 10 and extends in the longitudinal direction of the glass sheet 10. The monopole antenna unit 100 may have one end at which the disk element 400 is positioned.

The disk element 400 positioned at the longitudinal end of the monopole antenna element 100 has a rectangular cross-sectional structure and is brought into contact with the monopole antenna unit 100 so as to maintain a relatively large frequency band. The disk element 400 may have a square cross section and have one side having a length of 1/5 wavelength of a corresponding frequency.

Current applied to the monopole antenna unit 100, to which the disk element 400 is connected, forms an additional path, thereby performing current resonance of various frequencies. Because the disk element 400 has a square cross section, the disk element 400 has a wider bandwidth for stable operation of the antenna in addition to the corresponding frequency of 28 GHz.

In the different embodiments of the present disclosure, the monopole antenna unit 100 may have a longitudinal end at which the disk element 400 is positioned, thereby enabling current resonance corresponding to various frequencies.

Figure 4A:
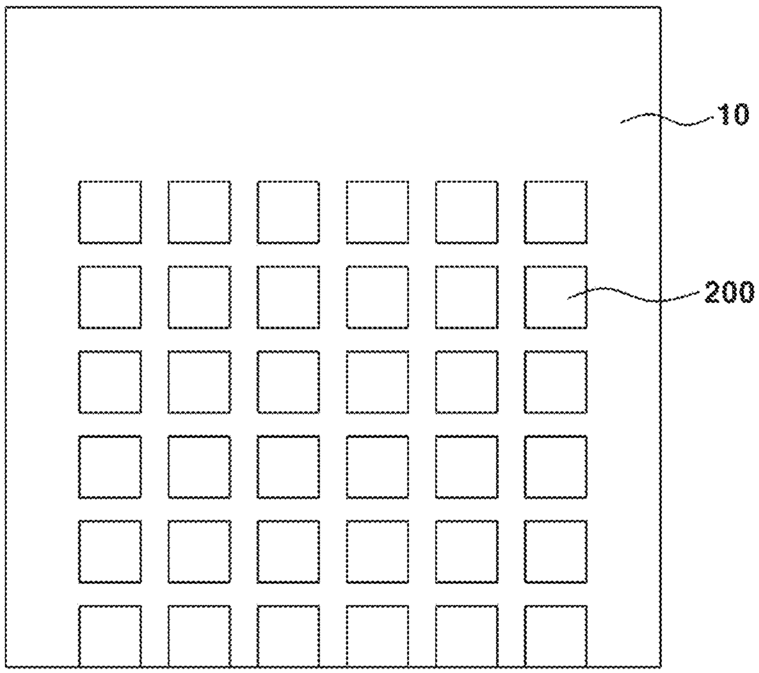
FIG. 4A illustrates another surface of a glass sheet including a rectangular patch plane, as an embodiment of the present disclosure.
Figure 4B:
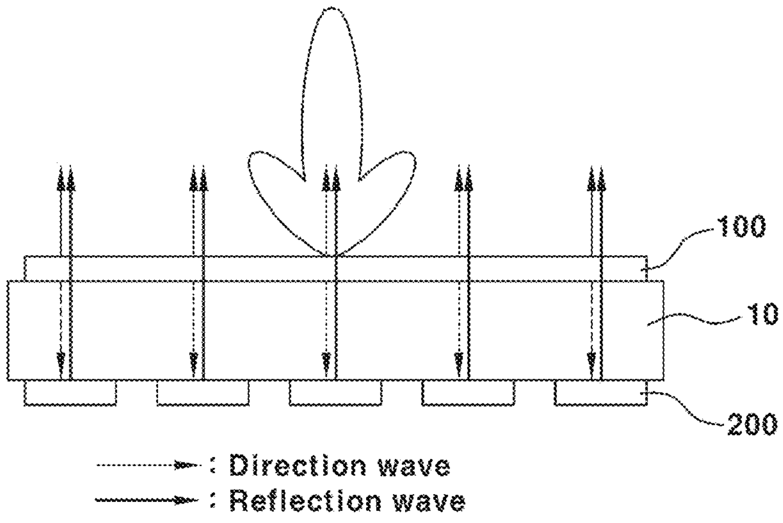
FIG. 4B illustrates a cross-sectional side view of a glass sheet including a monopole antenna unit, as an embodiment of the present disclosure.
Figure 4C:
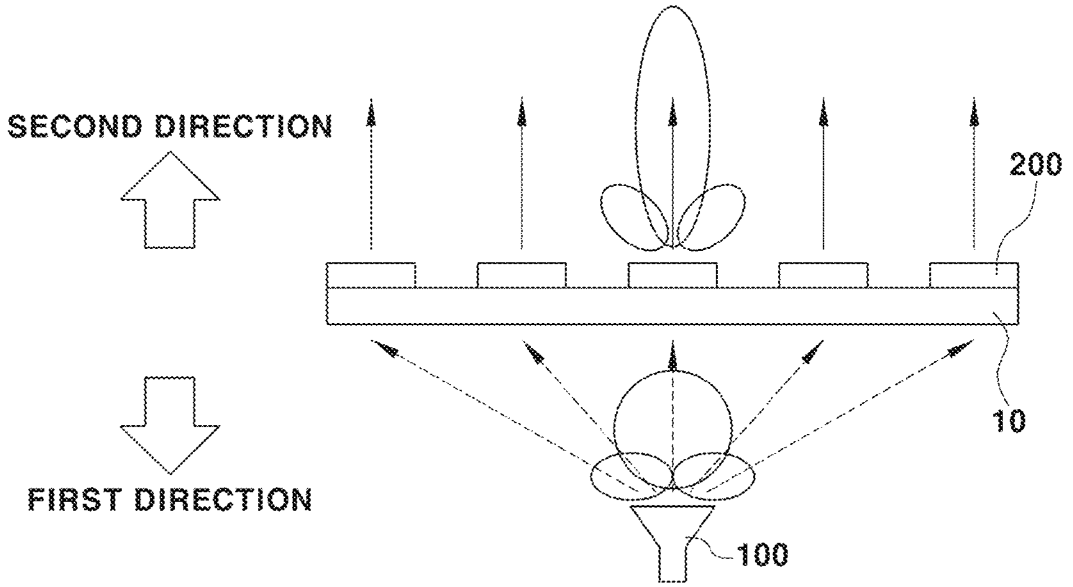
FIG. 4C illustrates a cross-sectional side view of a glass sheet in which a rectangular patch plane serves as a sheet-like waveguide, as an embodiment of the present disclosure.

As an embodiment of the present disclosure, FIG. 4A illustrates the other surface of the glass sheet 10 including the rectangular patch planes 200, and FIG. 4B illustrates a cross-sectional side view of the glass sheet 10 in which the rectangular patch planes 200 serve as a reflective surface. FIG. 4C illustrates a cross-sectional side view of the glass sheet 10 in which the rectangular patch planes 200 serve as a sheet-like waveguide.

The rectangular patch plane 200 of the present disclosure may control the main radiation direction of the antenna to be a direction (first direction) from the one surface of the glass sheet 10 on which the monopole antenna unit 100 is printed or to be a direction (second direction) from the rear surface (the other surface) of the glass sheet 10. The rectangular patch plane 200 has a shape in which rectangular elements of a uniform shape are arranged at uniform intervals, but the design thereof may vary depending on the purpose.

In the case of the antenna unit 100 radiating in the first direction, the rectangular patch plane 200 having a periodic structure is disposed on the other surface of the glass sheet 10. When the rectangular patch plane 200 is disposed on the other surface of the glass sheet 10, the same serves to reflect radio waves. In other words, the rectangular patch plane 200 having a set periodic structure performs the function of a reflective surface.

In one embodiment, the surface of the rectangular patch has a structure as illustrated in FIG. 4B. In the antenna radiating in the first direction, the direct wave radiated from the monopole antenna unit 100 is transferred towards the rectangular patch plane 200, which serves as a reflective surface. The radio wave transferred to the rectangular patch plane 200 is reflected from the reflective surface and transferred back towards the monopole antenna unit 100. When the reflected wave transferred from the rectangular patch plane 200 is in phase with the direct wave transferred from the monopole antenna unit 100, the two electromagnetic waves overlap, increasing the intensity of the radio wave radiated through one surface of the monopole antenna unit 100.

Conversely, when the phase difference between the reflected wave transferred from the rectangular patch plane 200 and the direct wave applied from the monopole antenna unit 100 is 180°, the direct wave applied from the monopole antenna unit 100 and the reflected wave transferred from the rectangular patch plane 200 cancel each other out, so that the intensity of the radio wave applied from the glass sheet 10 is reduced.

In one embodiment, the rectangular patch plane 200 serving as a reflective surface has a square shape and has one side having a length set to about 1/5 wavelength (2±0.2 mm) of a corresponding frequency. The reflective surface has one end located at a point about 1/20 wavelength (0.5±0.1 mm) of a corresponding frequency away from the one end of the glass sheet. The number of reflective surfaces is six in the x-direction and four in the y-direction. The frontal gain is 5.22 decibels relative to isotrope (dBi) when the reflective surfaces are spaced 1/50 wavelength (0.2±0.05 mm) of a corresponding frequency apart from one another. In this example, “dBi” is the unit of gain of the antenna, which means that power is transmitted in a predetermined direction at a predetermined magnification compared to an ideal isotropic antenna, and 3 dBi is about twice in magnification.

Compared with the above-described configuration, in the case of an antenna radiating in the second direction, as illustrated in FIG. 4C, the rectangular patch plane 200 having a periodic structure is disposed on the front surface of the glass sheet 10. When the rectangular patch plane 200 having the periodic structure is disposed on the front surface of the glass sheet 10, the rectangular patch plane 200 serves to guide the direction of radio waves. In other words, the rectangular patch plane 200 may serve as a sheet-like waveguide.

In the antenna structure including the monopole antenna unit 100 radiating in the second direction, the sheet-like waveguide has a structure that allows the antenna radiation pattern to be directed in the front direction by matching the direction and phase value of the radio wave radiated from the monopole antenna unit 100 as in the embodiment illustrated in FIG. 4C.

The rectangular patch plane 200 is affected by the distance from the monopole antenna unit 100 and is spaced apart from the monopole antenna unit 100 by a predetermined distance so as to determine the size and arrangement intervals thereof. As illustrated in FIG. 4C, the beam pattern from the monopole antenna unit 100 is radiated in various directions like the radiation direction of the rectangular patch plane 200. In order to impart high directivity to the beam pattern, which is a radiation element of the monopole antenna unit 100, the rectangular patch plane 200 arrangement is used. Generally, the rectangular patch plane 200 arrangement is positioned at a height spaced apart from the radiation element by a set interval, and wavefronts of the radio waves radiated from the monopole antenna unit 100 are all directed in the second direction.

The radio waves at the positions of all the rectangular patch planes 200 are designed to be in phase with the radio wave radiated from the monopole antenna unit 100. When all phases of radio waves are synchronized to the same phase angle, radio waves are amplified in response to all waveforms radiated in the same distance. Therefore, the antenna unit 100 of the present disclosure has a structure in which the arrangement of the rectangular patch planes 200 not only compensates the radiation direction of the radio wave from the antenna unit 100 in the front direction, but also allows the antenna radiation gain in the front direction to have a maximum value.

For this reason, the rectangular patch plane 200 is designed differently depending on the distance from the radiation surface of the antenna. The rectangular patch plane 200 is also generally designed to be located at a distance of ½ wavelength (5±0.5 mm) of a corresponding frequency from the monopole antenna unit 100.

Figure 5:
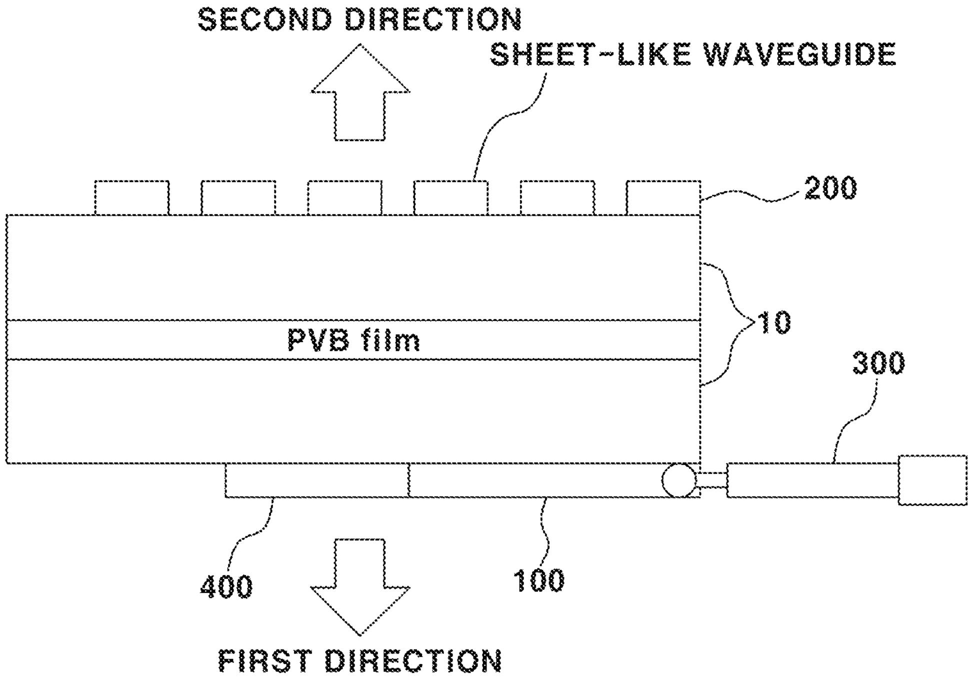
FIG. 5 illustrates a cross-sectional side view of a structure of a monopole antenna unit positioned on a laminated glass sheet, as an embodiment of the present disclosure.

As a different embodiment of the present disclosure, FIG. 5 illustrates a cross-sectional side view of a laminated glass sheet 10 on which an antenna unit 100 and a rectangular patch plane 200 are positioned.

As illustrated in the drawing, the antenna structure includes the monopole antenna unit 100 positioned on one outermost surface of the laminated glass sheet 10. The laminated glass sheet 10 has another outermost surface on which the rectangular patch plane 200 is positioned. Considering that the laminated glass sheet 10, which is a dielectric of a thick multilayer glass 10 for a vehicle including two sheets of glass 10 and a polyvinyl butyral (PVB) film, is used as a substrate, the laminated glass sheet 10 has a thickness within about ½ wavelength (5±0.5 mm) of a corresponding frequency.

The size and arrangement interval of the rectangular patch plane 200 are determined based on when the rectangular patch plane 200 has the biggest frontal gain due to the wavefronts, each at a position of a corresponding rectangular patch plane 200, being in phase. For this reason, according to an embodiment of the present disclosure, the rectangular patch plane 200 having a square shape has a length and width of about ⅕ wavelength (2±0.2 mm) of a corresponding frequency. The rectangular patch plane 200 also has the arrangement interval of about 1/20 wavelength (0.5±0.05 mm) of a corresponding frequency. The rectangular patch plane 200 may have a total of thirty-six elements in a six-by-six arrangement. When the rectangular patch plane 200 is set as described above, the frontal gain of the monopole antenna unit 100 may be maximized at a corresponding frequency.

Figure 6A:
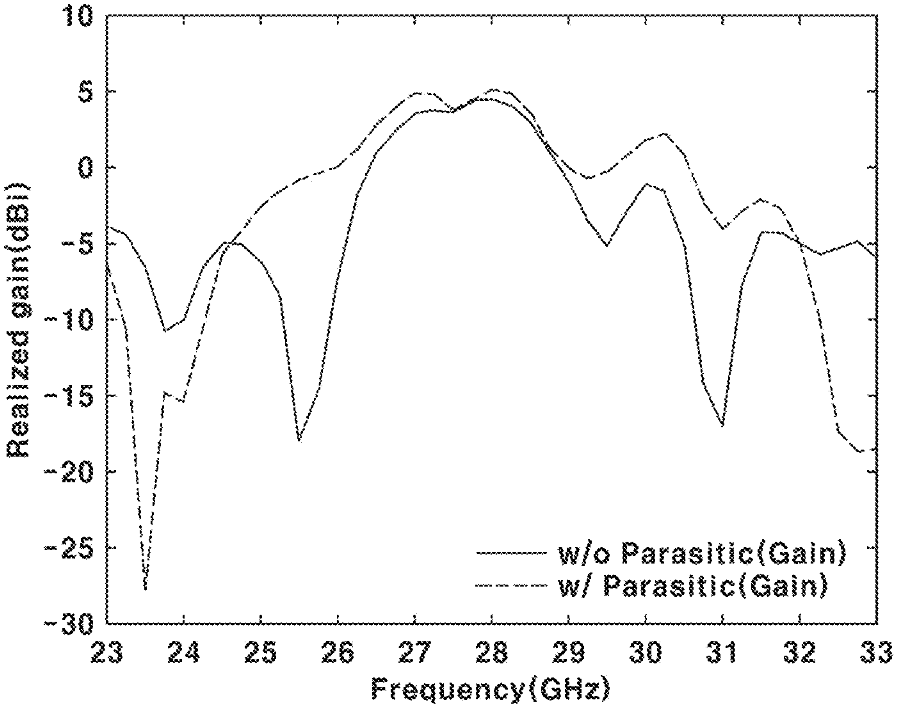
FIG. 6A shows reflection coefficient data on a monopole antenna unit including a parasitic element, as an embodiment of the present disclosure.

FIG. 6A shows data on a first direction gain when the parasitic element 500 is included, as an embodiment of the present disclosure.

The data is presented as a graph showing the gain of the monopole antenna unit 100 positioned on one surface of the single glass sheet 10. The graph shows the frontal gain of the antenna structure in which the ratio of permittivity of the glass sheet 10 is approximately 7.0, and the monopole antenna unit 100 has a longitudinal length of 1.23 mm from the CPW feeding line 300.

As illustrated in FIGS. 2A and 2B, the parasitic element 500 has a vertical length of about 117 wavelength of a corresponding frequency and has a width of about 1/9 wavelength of a corresponding frequency. Because the parasitic element 500 has a structure in which two groups of parasitic elements 500, each having two parasitic elements 500 spaced apart from each other in the longitudinal direction, are located on opposite sides, respectively, with respect to the monopole antenna unit 100, the first parasitic element 500 positioned adjacent to the CPW feeding element may have a gap of about 1/100 wavelength of a corresponding frequency in the longitudinal direction from the end of the CPW feeding element.

The parasitic element 500 positioned far from the CPW feeding element in the longitudinal direction may have a lower end spaced apart by 1/100 wavelength of a corresponding frequency from the upper end of the first parasitic element 500 in the longitudinal direction. The parasitic elements 500 each may have a gap of 1/100 wavelength of a corresponding frequency from the monopole antenna unit 100 in the widthwise direction.

Compared to the antenna structure that does not include the parasitic element 500, the maximum gain is increased by about 0.68 dBi at the corresponding frequency of 28 GHz, and the gain-bandwidth is larger by about 0.2 GHz.

Figure 6B:
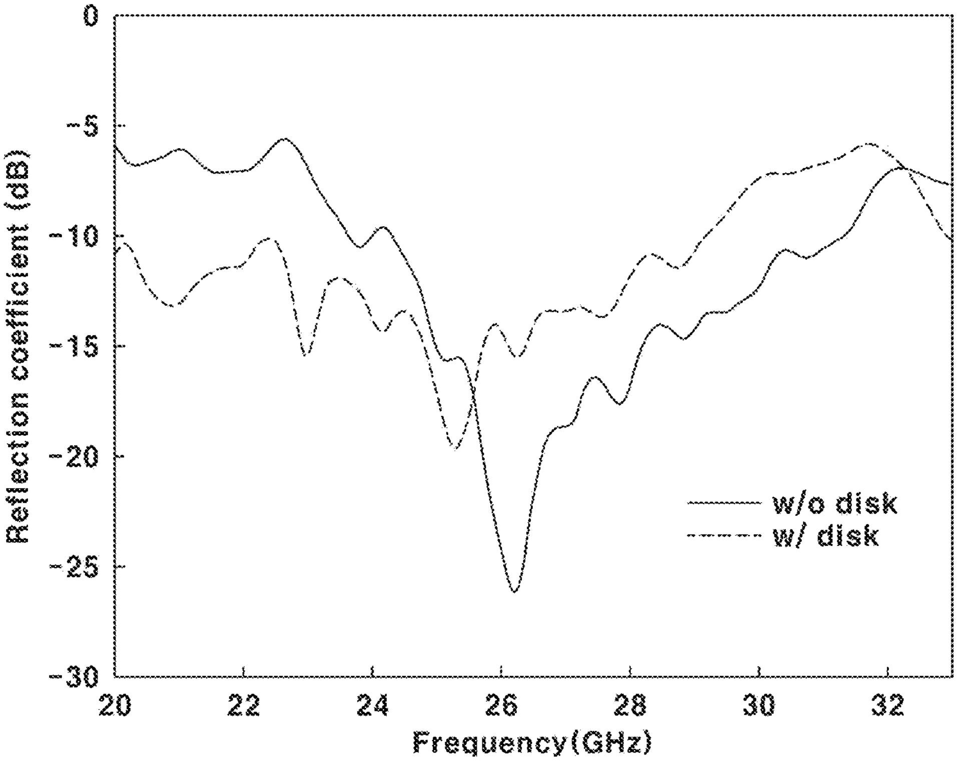
FIG. 6B shows reflection coefficient data on a monopole antenna unit including a disk element, as an embodiment of the present disclosure.

FIG. 6B shows the reflection coefficient when the monopole antenna unit 100 has one end provided with the disk element 400.

In order to measure the reflection coefficient, the disk element 400 positioned at the one end of the monopole antenna unit 100 may have a square cross section. Each side may have a length of ⅕ wavelength of a corresponding frequency.

As illustrated in the drawing, the reflection coefficient bandwidth is increased when the monopole antenna unit 100 has an end including the disk element 400. The bandwidth of the reflection coefficient at the corresponding frequency is 22.3% when the monopole antenna unit 100 does not include the disk element 400, and the same is increased to 31.5% when the antenna unit 100 includes the disk element 400. In this example, the ratio (%) is a proportion of a bandwidth to a corresponding frequency at which the antenna operates. In other words, the ratio (%) is an indicator showing how wide the minimum and maximum frequencies appear with respect to the center frequency at which the antenna operates. Accordingly, the shown bandwidth is a value calculated by the formula: (maximum frequency−minimum frequency)/(center frequency)*100(%).

Figure 7A:
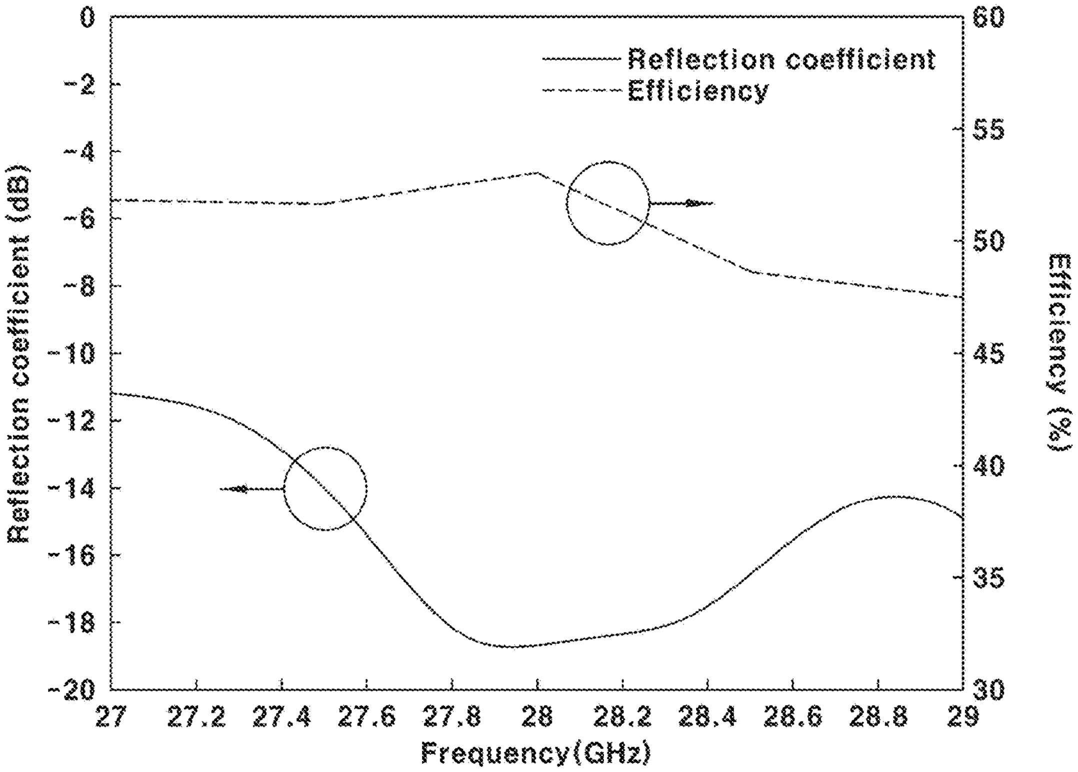
FIG. 7A shows reflection coefficient and efficiency data on a glass sheet including a monopole antenna unit in which a rectangular patch plane serves as a reflective surface, as an embodiment of the present disclosure.
Figure 7B:
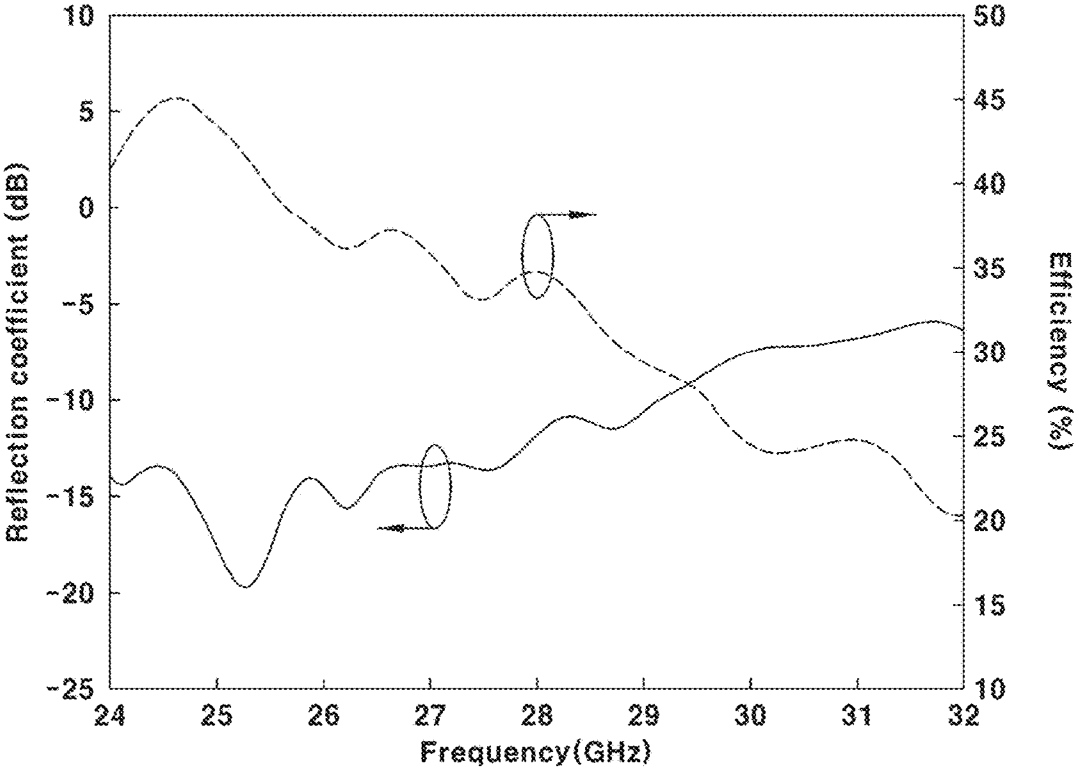
FIG. 7B shows reflection coefficient and efficiency data on a glass sheet including a monopole antenna unit in which a rectangular patch plane serves as a sheet-like waveguide, as an embodiment of the present disclosure.

As an embodiment of the present disclosure in which the rectangular patch plane 200 radiates in the first direction, FIG. 7A shows signals when the parasitic element 500 and the rectangular patch plane 200 serve as a reflective surface, and FIG. 7B shows signals when the disk element 400 and the rectangular patch plane 200 serve as a sheet-like waveguide.

The reflection coefficient is a coefficient when a signal is applied to the monopole antenna unit 100 from a system including a feeding line, the applied signal is not transmitted to the antenna and is reflected and returned.

The reflection coefficient is generally expressed in decibels (dB), and a reflection coefficient of −10 dB or less means that more than 90% of the power transmitted from the system is transmitted to the antenna. Therefore, a reflection coefficient of −10 dB or less is a major indicator of the excellent performance of the antenna in the corresponding frequency band.

Reflection efficiency (reflection coefficient) refers to the rate at which the signal transmitted to the antenna is radiated into the atmosphere in the form of electromagnetic waves without being converted into heat or other energy due to the material characteristics of the glass sheet 10 substrate or the structural characteristics of the antenna. An efficiency of 0 (0%) means that no electromagnetic waves are radiated into the atmosphere, and an efficiency of 1 (100%) means that all power applied to the antenna is radiated to the atmosphere in the form of electromagnetic waves.

In an embodiment of the present disclosure, when an antenna structure radiates radio waves in the first direction through the monopole antenna unit 100, the monopole antenna unit 100 including the parasitic element 500 has a reflection coefficient of −18.7 dB and an efficiency of 53.1% at a corresponding frequency of 28 GHz. This result shows that the monopole antenna unit 100, to which the rectangular patch plane 200 is adopted as a reflective surface, operates excellently.

Conversely, FIG. 7B illustrates the rectangular patch plane 200 of the antenna unit 100 including the disk element 400, where the rectangular patch plane 200 serves as a sheet-like waveguide. The data in FIG. 7B shows the structure in which radio waves are radiated from the antenna unit 100 in the second direction. The structure has a reflection coefficient of −11.8 dB at 28 GHz, which is the corresponding frequency of the monopole antenna unit 100 and has a wide operating band of 24 GHz to 29.1 GHz due to the disk structure. The antenna unit 100 of the present disclosure has an efficiency of 34.8% at an operating frequency of 28 GHz. Accordingly, the monopole antenna to which the waveguide is applied exhibits excellent performance.

Figure 8A:
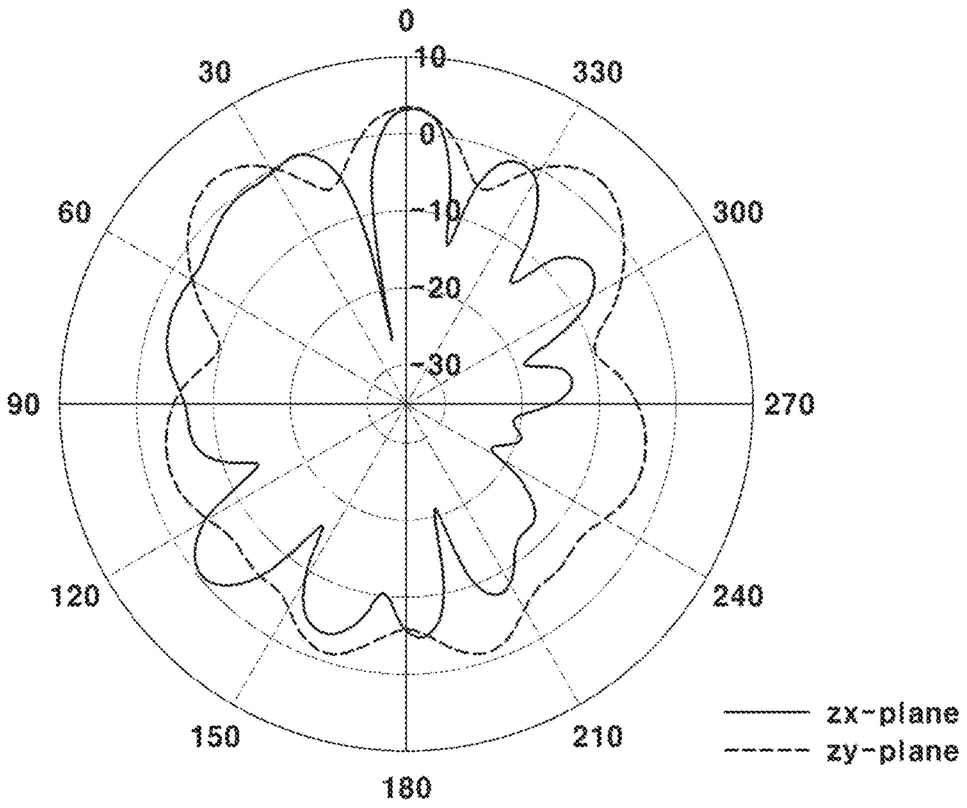
FIG. 8A shows a three-dimensional radiation pattern of an antenna unit including a monopole antenna unit in which a rectangular patch plane serves as a reflective surface, as an embodiment of the present disclosure.
Figure 8B:
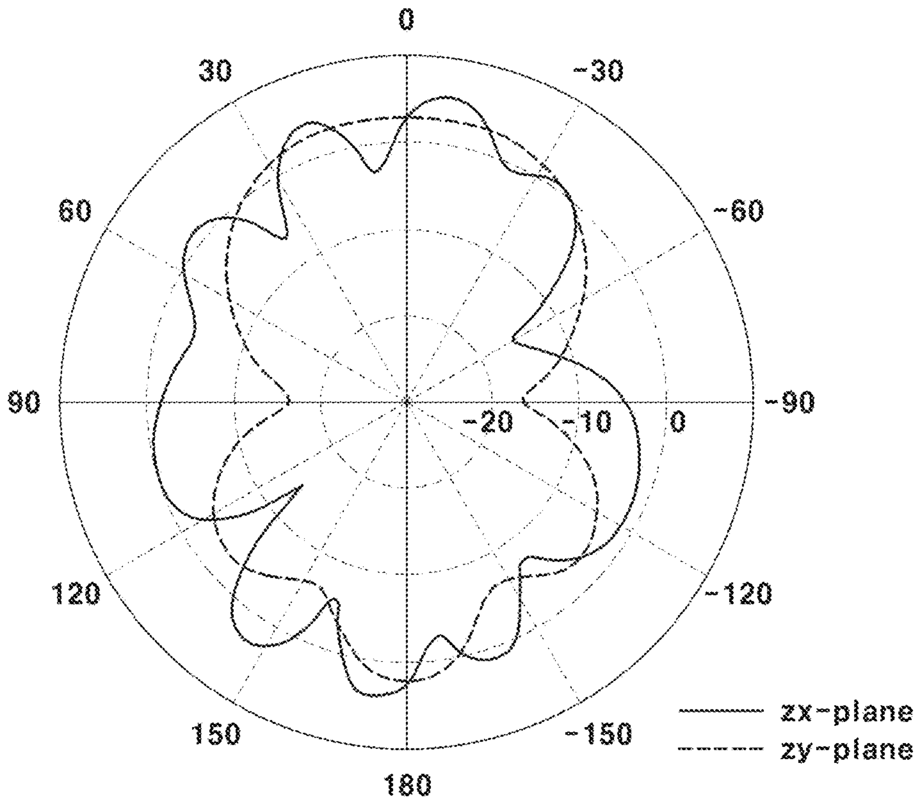
FIG. 8B shows a three-dimensional radiation pattern of an antenna unit including a monopole antenna unit in which a rectangular patch plane serves as a sheet-like waveguide, as an embodiment of the present disclosure.

FIGS. 8A and 8B illustrate radiation patterns in both the zx-plane and zy-plane directions of the array antenna according to an embodiment of the present disclosure.

As described in this specification, the radiation pattern may be focused to an efficient position for communication by adjusting the radiation direction of the antenna unit 100 in a predetermined direction. The gain of the antenna is expressed in dBi, which means that power is transmitted in a predetermined direction at a predetermined magnification compared to an ideal isotropic antenna.

As illustrated in FIG. 8A, the structure radiating in the first direction has a gain of 3.9 dBi for the front direction at a frequency of 28 GHz. This means that transmitted power is up to 2.45 times greater than that of an isotropic antenna in a direction perpendicular to the plane of the antenna.

The structure radiating in the second direction has a gain of 3.2 dBi for the front direction at a frequency of 28 GHz. This means that transmitted power is up to 2 times greater than that of an isotropic antenna in the direction perpendicular to the plane of the antenna.

In this example, a reference gain is 1 dBi, which is the gain of the isotropic antenna, and is converted to 2.45 times in magnification as a linear value.

In order to see the additional effect compared to the case where only the monopole antenna unit exists, FIGS. 8A and 8B show the results of separate simulations in which the parasitic element 500 and the disk element 400 are added to the antenna structure. Each of the simulation results for the case where only the monopole antenna unit 100 is present, the case where the parasitic element 500 is added to the monopole antenna unit 100, and the case where the disk element 400 is added to the monopole antenna unit 100 are compared.

As is apparent from the above description, the present disclosure provides the following effects.

The present disclosure provides an antenna structure with high safety that is provided only at a predetermined position on a glass sheet by including a transmission line connected to a single monopole antenna unit located on one surface of the glass sheet.

The present disclosure provides an antenna capable of matching the phase values of currents resonating through the monopole antenna unit by providing an optimized monopole element.

In the present disclosure, a rectangular patch plane is located at a position, the position corresponding to the monopole antenna unit positioned on one surface of the glass sheet, on the other surface of the glass sheet and is used as a waveguide or reflective surface to thereby increase the gain at a corresponding frequency.

The detailed description is merely illustrative of the present disclosure. The above description shows and describes embodiments of the present disclosure, but the present disclosure can be used in various other combinations, modifications, and environments. Changes or modifications are possible within the scope of the idea of the disclosure disclosed herein, the scope of equivalents to the described disclosure, and/or the scope of ordinary skill or knowledge in the art. The described embodiments describe the best state for implementing the technical idea of the present disclosure, and various changes required for specific application fields and uses of the present disclosure are possible. Therefore, the detailed description of the present disclosure is not intended to limit the present disclosure to the disclosed embodiments. Also, the appended claims should be construed to include other embodiments.

What is claimed is:

1. A glass antenna structure comprising:
- a glass sheet provided in a vehicle;
- a monopole antenna unit located on one surface of the glass sheet;
- a plurality of rectangular patch planes located on another surface of the glass sheet at a position corresponding to the monopole antenna unit; and
- a co-planar waveguide (CPW) feeding line in contact with one end of the monopole antenna unit.

2. The glass antenna structure according to claim 1, further comprising a disk element located at an end of the monopole antenna unit.

3. The glass antenna structure according to claim 2, wherein the disk element has one side having a length of ⅕ wavelength of a corresponding frequency.

4. The glass antenna structure according to claim 1, further comprising at least one parasitic element located on the one surface of the glass sheet on which the monopole antenna unit is located and located adjacent to a side surface of the monopole antenna unit.

5. The glass antenna structure according to claim 4, wherein:
- the parasitic element is divided into two groups, each group having two longitudinally separated parasitic elements located at each side in a widthwise direction of the monopole antenna unit, and
- one parasitic element is spaced apart in a longitudinal direction from another parasitic element adjacent thereto or from the CPW feeding line by 0.15±0.05 millimeters (mm) and is spaced apart from the monopole antenna unit by 0.15±0.05 mm in the widthwise direction.

6. The glass antenna structure according to claim 1, wherein the rectangular patch planes are spaced apart from one another to have identical spacings in a longitudinal direction of the glass sheet.

7. The glass antenna structure according to claim 1, wherein the rectangular patch planes are spaced apart from one another to have identical spacings in a widthwise direction of the glass sheet.

8. The glass antenna structure according to claim 1, wherein the CPW feeding line has a width of 0.5±0.1 millimeters (mm).

9. The glass antenna structure according to claim 1, wherein the monopole antenna unit has a longitudinal length of 1.23±0.1 millimeters (mm) from the CPW feeding line.

10. The glass antenna structure according to claim 1, wherein the glass sheet has a thickness of ⅓ wavelength to ½ wavelength of a corresponding frequency.

* * * * *